United States Patent [19]

Herring

[11] Patent Number: 5,077,792

[45] Date of Patent: Dec. 31, 1991

[54] FRANKING SYSTEM

[75] Inventor: William J. Herring, Brentwood, United Kingdom

[73] Assignee: Alcated Business Systems Limited, United Kingdom

[21] Appl. No.: 457,836

[22] Filed: Dec. 27, 1989

[30] Foreign Application Priority Data

Dec. 30, 1988 [GB] United Kingdom ................. 8830423

[51] Int. Cl.[5] .......................... H04K 1/00; H04K 9/00; H04L 9/02

[52] U.S. Cl. ........................................ 380/24; 380/46; 364/464.02

[58] Field of Search ................... 380/4, 23, 24, 25, 46; 340/825.33; 364/464.02

[56] References Cited

U.S. PATENT DOCUMENTS

| | | | |
|---|---|---|---|
| 4,630,201 | 12/1986 | White | 340/825.34 |
| 4,665,396 | 5/1987 | Dielman | 380/23 |
| 4,787,045 | 11/1988 | Storace et al. | 380/23 |
| 4,907,161 | 3/1990 | Sansone et al. | 364/464.02 |
| 4,907,271 | 3/1990 | Gilham | 380/23 |
| 4,934,846 | 6/1990 | Gilham | 380/23 |

*Primary Examiner*—Stephen C. Buczinski

*Attorney, Agent, or Firm*—Shoemaker and Mattare, Ltd

[57] ABSTRACT

Credit in a credit register of a franking meter is reset by telephone communication with a resetting terminal. A request for a selected credit amount is transmitted from the meter apparatus to the terminal and in response the terminal interrogates the meter to establish identity of the meter. The terminal locks the meter to prevent operation of the meter for franking while the resetting takes place. The terminal checks the validity of the reset request with customer records stored in the terminal and if valid transmits a reset signal which includes the credit reset amount and a pseudo-random number (TID) to enable the meter to reset its credit register. Upon completion of the resetting the meter sends a request including a random number for unlocking of the meter. The terminal requests the register values from the meter, each request including a random number. The meter transmits the register values together with the random number to the terminal. If the value and random number are correct, the terminal unlocks the meter by sending an unlock signal which includes the TID and random number.

5 Claims, 6 Drawing Sheets

FRANKING SYSTEM

BACKGROUND OF THE INVENTION

This invention relates to franking systems in which franking machines are utilised to frank postal items with a value of postage charge and in which funding of the franking machines with credit for use in franking is effected remotely.

Franking machines for franking postal items and which are operated on a prepayment system are provided with a credit register which stores a value of credit for which payment has been made to a postal authority and which remains available for use in franking of mail items. Initially, upon payment to the postal authority a value is entered into the credit register corresponding to the payment. As items are franked with postage charges, the value in the credit register is decremented by the postage charges and hence represents the value remaining available for franking of postal items. When the value in the credit register has reduced to a predetermined value, which may be zero or a higher value, the accounting and control circuits of the franking meter prevent further franking operations until the user of the franking machine has purchased further credit from the postal authority and a corresponding credit value has been added into the credit register. For reasons of security, the user of the machine is not permitted to have access to the interior of the franking meter or to any of the accounting circuits of the meter. Accordingly the addition of credit to the credit register is not permitted to be effected by the user of the machine. In known franking machines, the franking meter is a portable module and when additional credit is to be entered in the meter the module is taken to the postal authority for resetting of the credit register. When the meter is returned to the postal authority for resetting the credit register, the postal authority is enabled to effect an auditing operation in which the contents of other registers such as a tote register which records the total value of franking issued by the meter and an item counter which records the number of items franked by the meter are read. The auditing operation enables the postal authority to check usage of the machine as recorded by the various registers to ensure that the data in the registers is in agreement with usage of the machine since the preceding auditing.

The need to take the meter to a postal authority centre is inconvenient and time consuming to users of franking machines. The machine is not operable while the meter is removed for resetting and hence users need to anticipate their need for credit in order to prevent interruption to franking of mail items. In addition, the postal authority has to provide a resetting service at a large number of locations, for example at every main post office, in order to provide adequate accessibility of the service to customers.

In order to overcome the inconvenience of removing the meter and taking it to a postal authority resetting centre remote resetting systems have been proposed and are used. In one system an electronic storage module is utilised to carry data between a postal authority resetting centre and franking machines at users locations. The module has credit data entered into and stored in it by the postal authority and after receipt thereof by the customer, the module is connected to the meter to enable the meter to read the credit data. The meter enters audit data into the module and upon return of the module to the postal authority, the postal authority reads the audit data and is enabled to carry out auditing of the usage of the meter. Thus the meter does not need to be removed from the franking machine for resetting and resetting is effected at the user's location. All data for the resetting of credit and auditing is carried by the module which is of sufficiently small size to sent as a mail item. In order to provide security for the data transported in the module, the module also carries a code in the form of a pseudo-random number which is compared with a corresponding pseudo-random number stored in the franking meter and in the postal authority resetting computer. The code in the module is compared with that in the meter or computer and, if there is a match, the data in the module is accepted as valid. The code is changed after each resetting transaction to prevent fraudulent resetting of the meter.

In another system resetting of the credit registers has been effected remotely by use of the telephone network for transmission of data. Communication between the franking meter and the telephone network has required the intervention of the user and in order to provide security and ensure resetting of the credit register with an authorised value of credit the user has been required to enter a code on the keypad of the telephone and to receive a code by voice transmission which then has to be entered by the user on the keyboard of the meter. The entry of a string of digits, which of necessity is meaningless to the user, is likely to lead to incorrect entry of the code and can necessitate repeated attempts to reset the meter.

SUMMARY OF THE INVENTION

According to one broad aspect of the invention a method of resetting credit in a credit register of franking meter apparatus by communication directly between the franking meter apparatus and a remotely located resetting terminal includes the steps of causing the franking meter to send a request payment message to the terminal, said message including a representation of a selected value amount to be added to the credit register; said terminal responding by checking validity of the request for payment, checking a current value in the credit register and then sending a message including a representation of said selected value amount if the request is valid.

According to another broad aspect of the invention a method of unlocking a franking meter which has locked due to occurrence of a predetermined condition includes the steps of establishing communication directly between the franking meter and a remotely located resetting terminal; causing the franking meter to send a request unlock message to the terminal; transmitting from the terminal to the franking meter at least one message requesting franking meter data, each said message including a random number; in response to the message from the terminal, transmitting from the meter to the terminal the meter data and said random number, said terminal responding by checking validity of the request for unlock and if the request for unlock is valid subsequently transmitting an unlock message to the meter effective to unlock the meter until the re-occurrence of said predetermined condition.

According to a less broad aspect of the invention a method of resetting credit in a credit register of franking meter apparatus connectable by communication means to a resetting terminal apparatus includes the steps of transmitting a request for payment of a selected value amount from the meter apparatus to the terminal apparatus; in response to said request causing the terminal apparatus to interrogate the meter apparatus to establish identity of the meter; setting means to prevent operation of the meter for franking; transmitting a value of credit in the credit register to the terminal apparatus; checking validity of the request for payment and if valid transmitting a message to the meter to enable addition of the selected value amount to the credit register; and unsetting the means preventing operation of the meter for franking after acceptance or rejection of the selected value amount in the credit register.

BRIEF DESCRIPTION OF THE DRAWING

An embodiment of the invention will now be described by way of example with reference to the drawings in which.

DESCRIPTION OF THE PREFERRED EMBODIMENT

Figure 1:
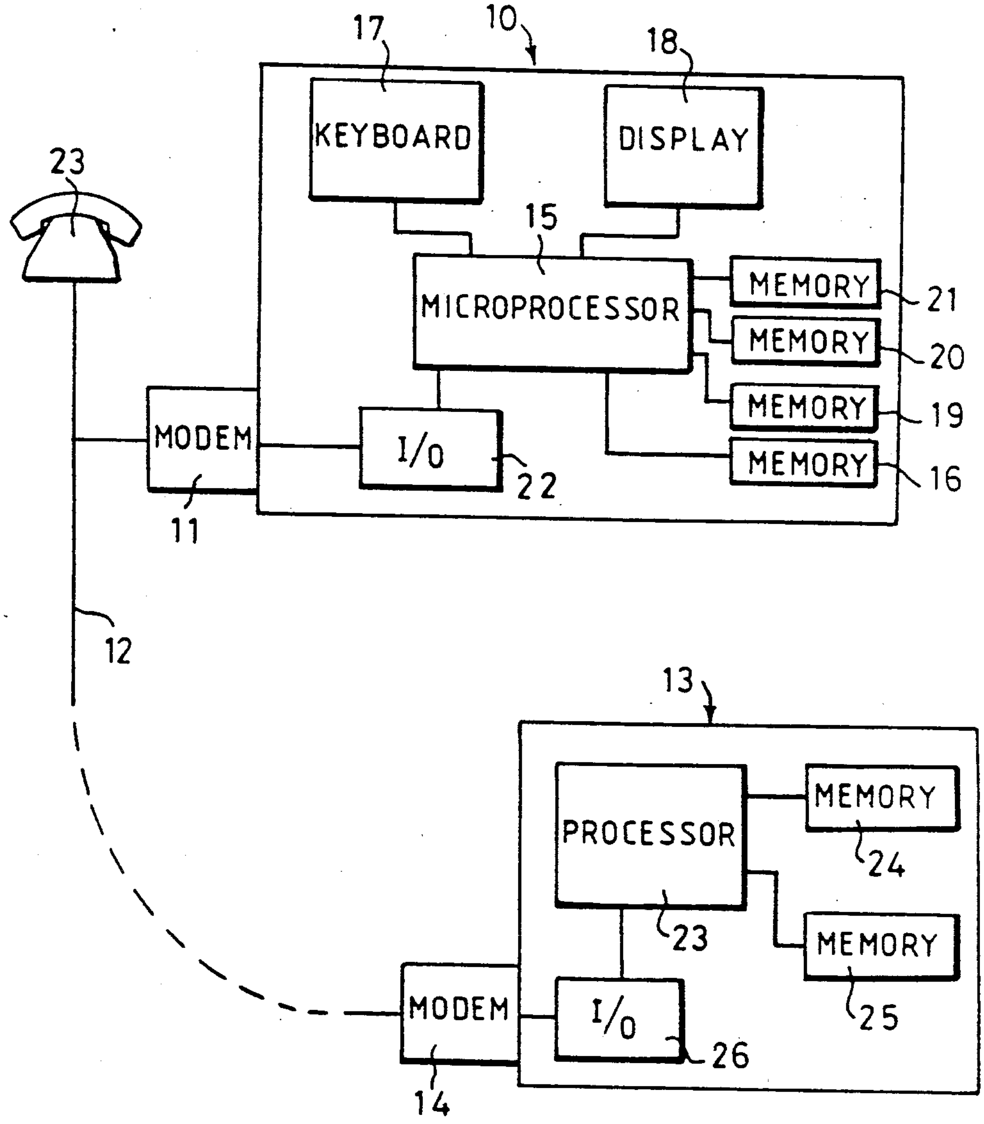
FIG. 1 is a block diagram of a franking meter connected by telephone network to a remote resetting terminal, FIGS. 2(*a*), 2(*b*) and 2(*c*) are a flow chart of a resetting routine carried out by the franking meter, and FIGS. 3(*a*) and 3(*b*) are a flow chart of a resetting routine carried out bt the resetting terminal.
Figure 2A:
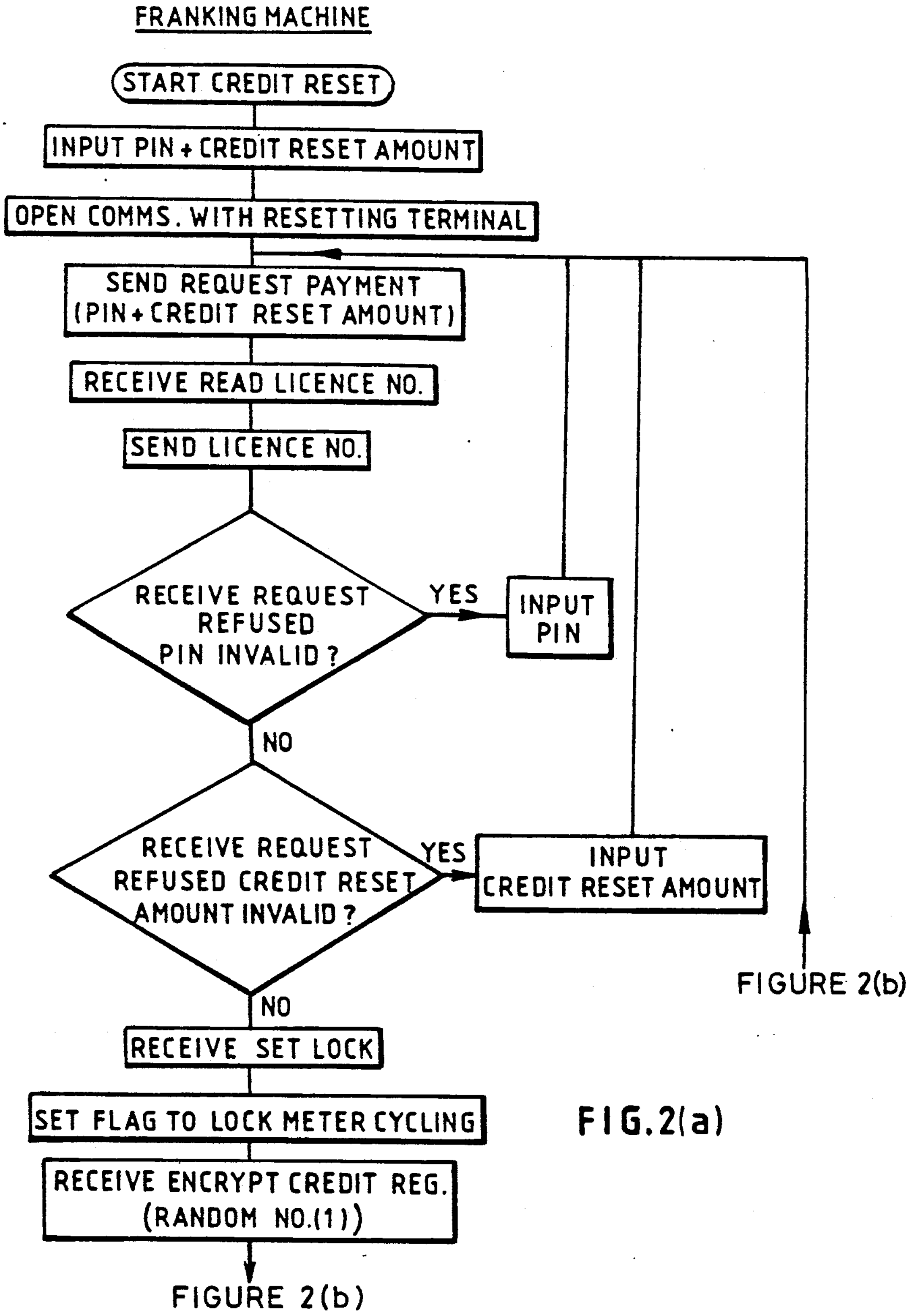
Figure 2B:
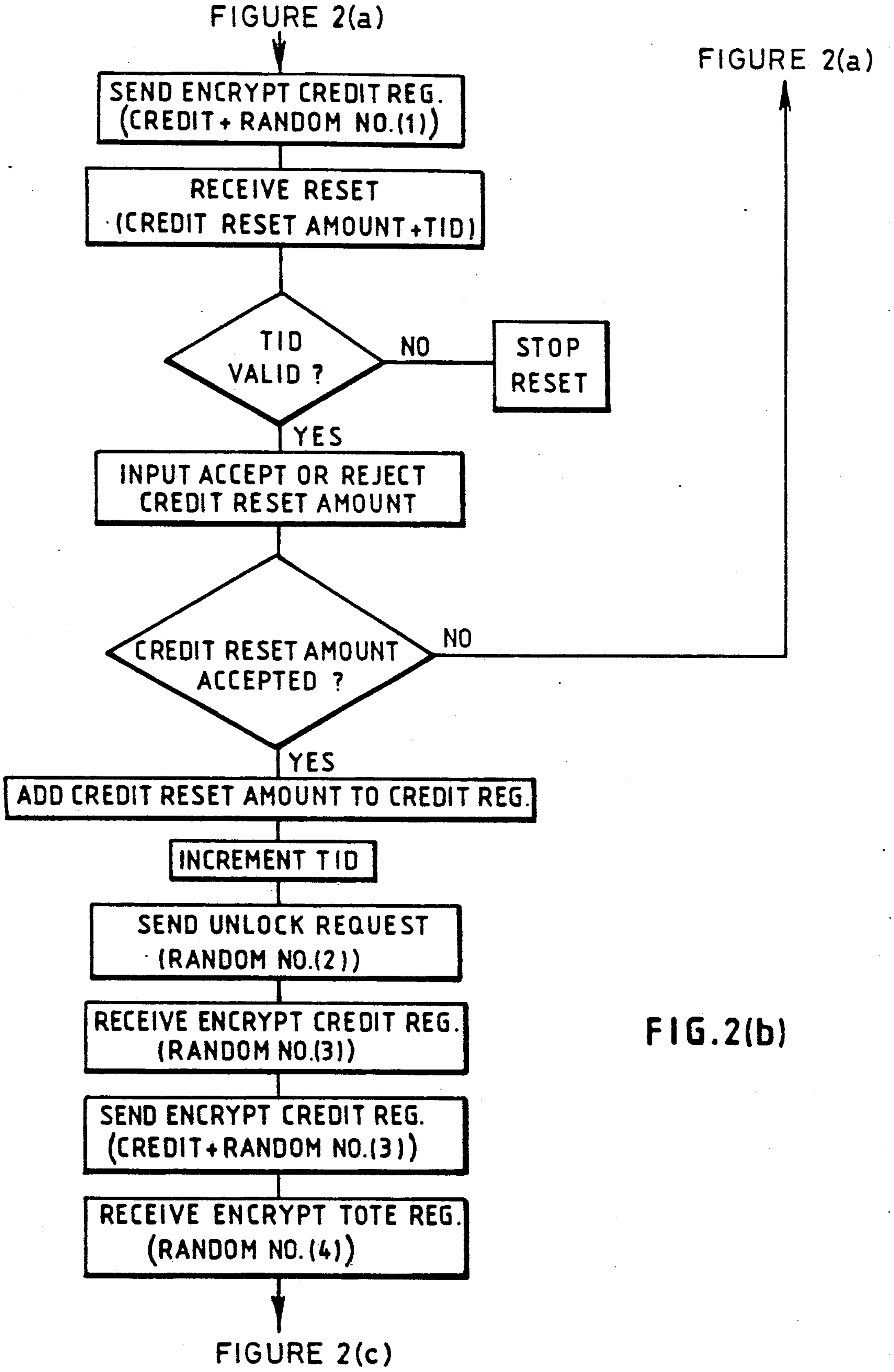
Figure 2C:
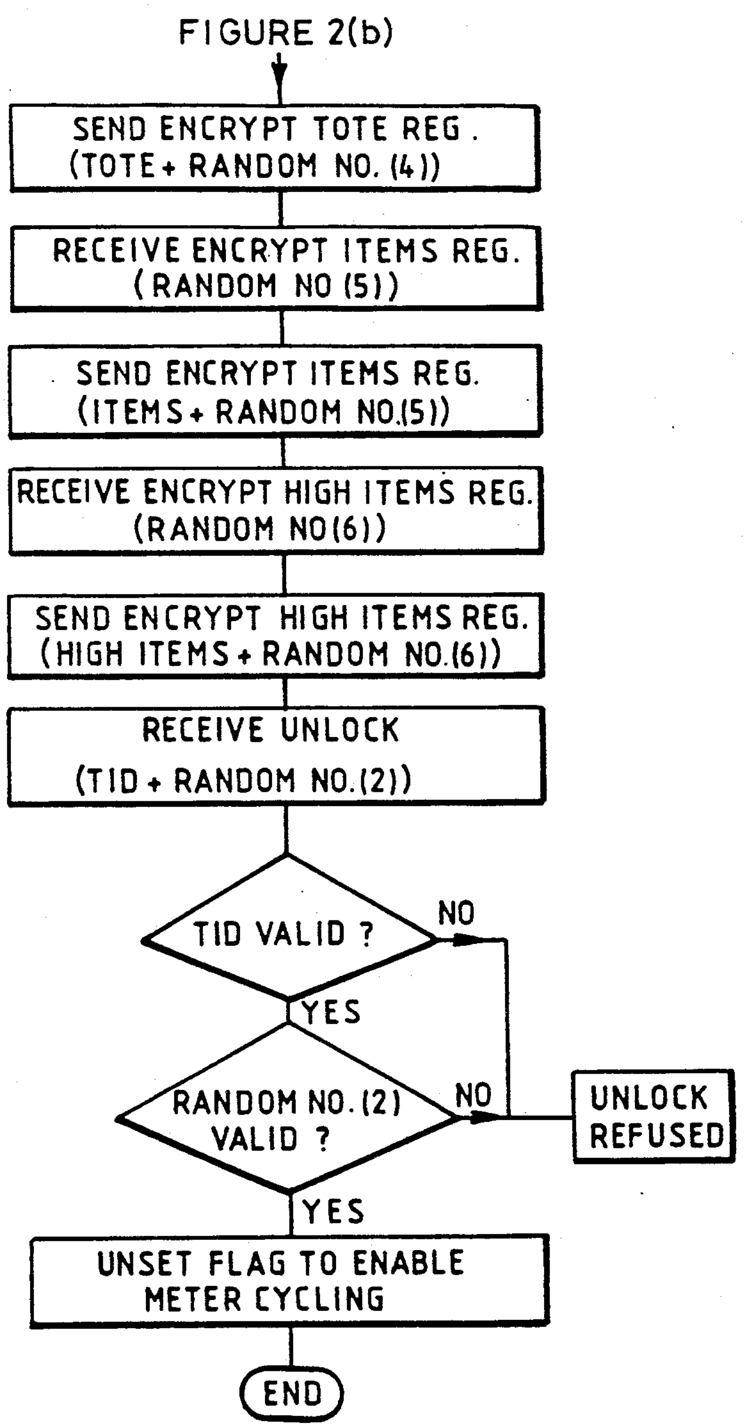
Figure 3A:
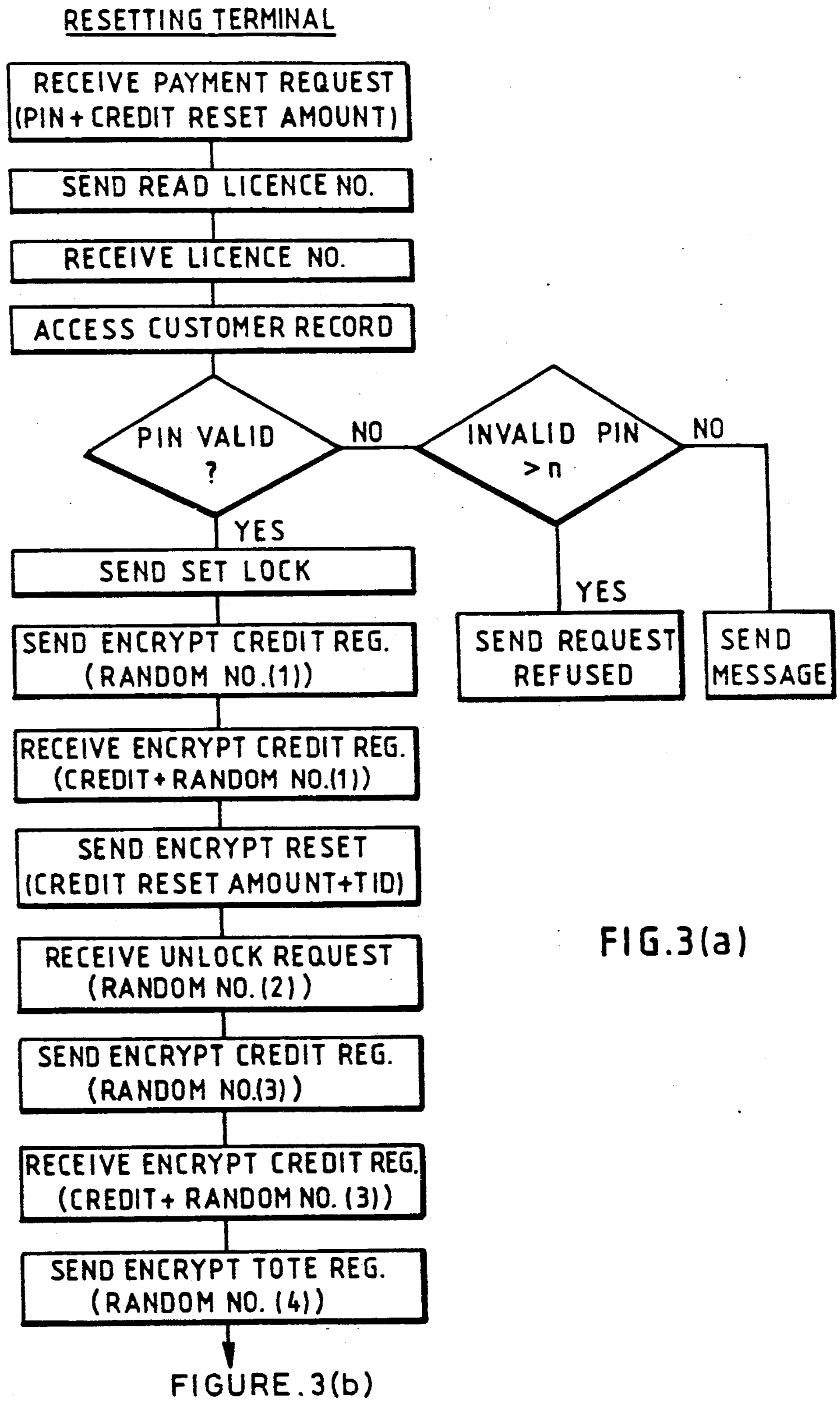
Figure 3B:
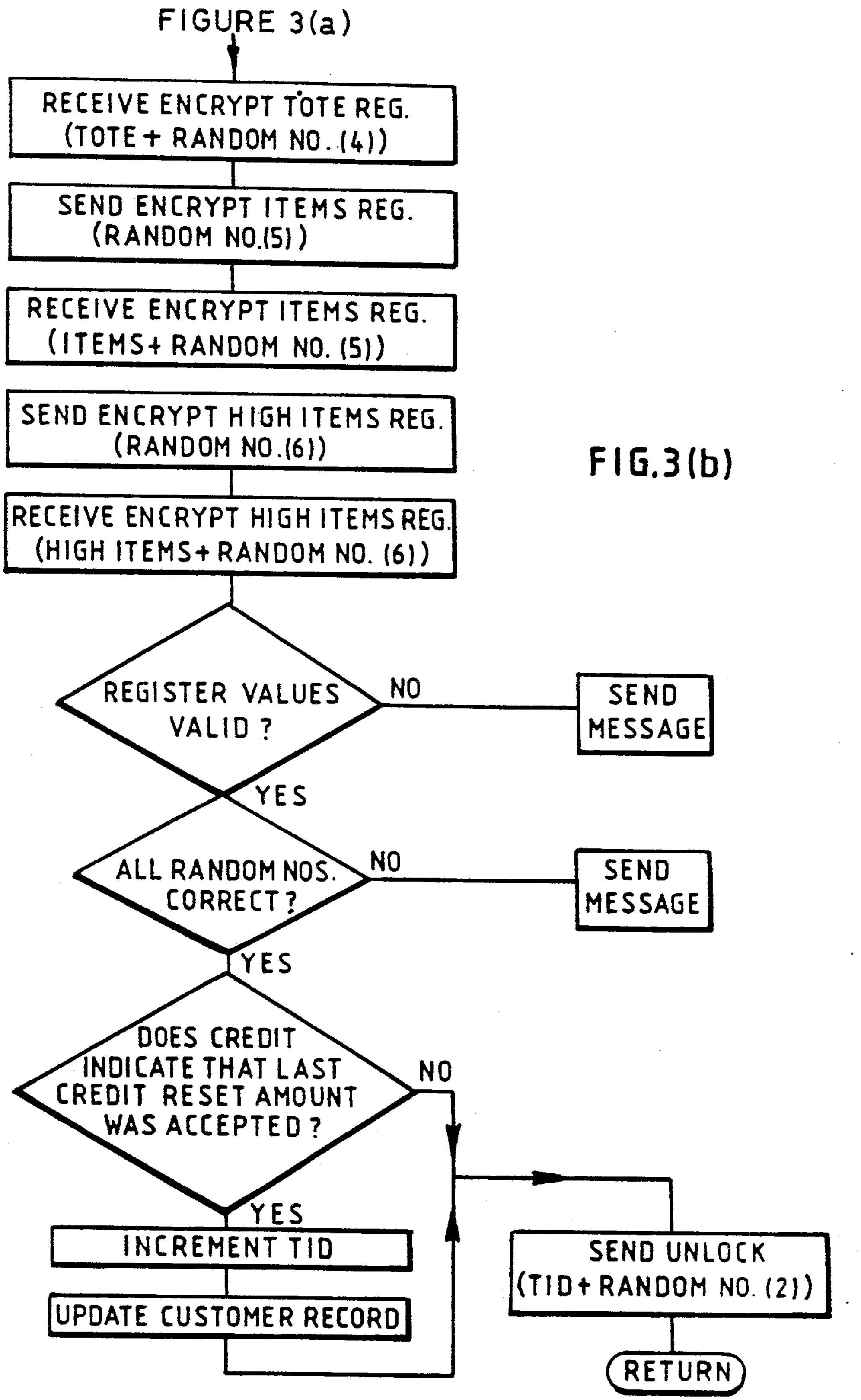

Referring to the drawings, a franking meter 10 is connected via a modem 11 to a telephone network 12. Similarly a remote terminal 13 at a postal authority resetting centre is connected to the telephone network by a modem 14.

The franking meter comprises a secure housing within which electronic accounting and control circuits are located. The electronic circuits include a microprocessor 15 operating under the control of software routines stored in a program memory 16 to carry out accounting and control functions of the meter. The meter is provided with a keyboard 17 which has numeric keys and control keys for entry, by a user of the meter, of data and control signals respectively to the micro-processor 15 and a display 18 for display of data and machine status signals to the user. Non-volatile memories 19 and 20 are provided for storing accounting data relating to usage of the meter in carrying out franking operations and also for storing permanent data such as meter identification data. A random access memory 21 is provided as a working store for the micro-processor. The memories 19, 20 each provide a credit register for value of credit remaining available for use in franking, a tote register for accumulated value of franking carried out by the meter and a register for the number of items franked by the meter. In addition each register is duplicated within each of the memories. Thus each item of accounting data is stored in four registers thereby ensuring integrity of the accounting data stored in the meter. In each franking operation, the credit registers are each decremented by the value of the postage charge, the tote registers are incremented by the value of postage charge and the item count is incremented by one. Prior to carrying out each franking operation, the micro-processor reads the credit value in the credit registers to ensure that the credit value is higher than a predetermined value and that the credit value is sufficient for the postage charge of the intended franking. If the credit value is less than the predetermined value, the meter is locked and cannot be used for further franking until the credit register has been reset with additional credit. Resetting of the meter with additional credit is effected by means of routines effected by the franking meter and remote terminal via communication over the telephone network. Generally such resetting routines will be initiated by a user at the location of the franking meter. In order to enable the meter to communicate via the telephone network, an input/output interface circuit 22 is connected between input/output ports of the micro-processor 16 and the modem 11. The modem 11 may be an external unit connected to the meter by plug and socket connection or may be located internally of the meter housing with a plug and socket connection to the telephone network. The meter may be provided with an auto-dialling routine whereby the meter transmits dial pulses, or tones, corresponding to the telephone number allocated to the telephone connection to the remote terminal. If such auto-dialling is not provided, a telephone handset is connected in parallel with the modem to enable a user wishing to cause communication of the franking meter with the remote terminal to monitor the progress of the telephone call and to dial the appropriate telephone number.

When the meter is operated to carry out franking operations, the program routine for such operations includes checking the status of a flag stored in nonvolatile memory. If the flag is un-set the routine proceeds to carry out the required franking operation however if the flag is set the routine is unable to proceed with a franking operation. It will be appreciated that during a franking operation routine, values stored in the credit, and tote registers are changed in accordance with the value of postage charge for that franking and the item count is incremented. Thus the effect of setting the flag is to prevent changes due to franking operations occurring to the values stored in the registers.

The resetting terminal comprises a computer which includes a processor 23 operating under the control of program routines stored in a memory 24 and a random access memory 25 for storing customer records. For communication with franking meters via the telephone network 12, the processor 23 is connected to the modem 14 by means of interface circuits 26.

When a user requires additional credit for use in franking, the user operates a control key of the keyboard to enter a credit resetting mode of operation. The microprocessor initiates a resetting program routine and causes the display to indicate to the user that the meter is in resetting mode. In order to prevent unauthorised personnel from proceeding in the resetting mode and resetting the credit in the meter, the user is then required to enter a personal identification number (PIN) by means of the keyboard. Following this, the amount of credit required is entered by means of the keyboard. The microprocessor of the meter opens communication via the modem with the telephone network, and if an auto-dialling facility is provided, the microprocessor reads out a telephone number of the resetting terminal from nonvolatile memory sends corresponding dialling pulses, or tones if appropriate, to the telephone network to establish telephonic communication with the remote resetting terminal. If an auto-dialling facility is not provided the user dials the remote terminal number on the telephone handset and when an answer signal, which may be tone or voice, is received from the remote terminal the user replaces the handset. When the dialling is effected manually by means of the handset, the meter program routine allows a predetermined time period for replacement of the handset prior to continuing with the credit resetting routine. The meter then sends a 'request payment' message comprising the personal identification number and the payment amount required to the resetting terminal. Upon receipt of the 'request payment' message, the terminal sends a 'read register' message to the meter to effect reading of the licence number of the meter, stored in one of the memories of the meter. The meter returns the licence number in a 'present register' message and upon receipt thereof the processor 23 of the resetting terminal accesses a record of customer data 25 which includes for each meter the personal identification number authorised for that meter. The terminal compares the received personal identification number with that in the stored record for that meter licence number. The customer record also contains data relating to the credit status of the customer. If the received personal identification number matches that for the meter licence number in the stored record and the amount of credit requested in the payment request is acceptable the resetting terminal proceeds with the resetting routine. However if the request for credit is unacceptable, for example it is for too large an amount of credit, or the personal identification number is not correct, the terminal returns a 'request refused' message to the meter. The message contains an indication relating to the error which has occurred and this causes an appropriate indication to be displayed to the user. If the personal identification number is incorrect, the user may enter an alternative identification number. The resetting terminal logs the number of sequential incorrect personal identification numbers received and when a predetermined limit 'n' is reached the resetting terminal rejects any further requests for credit and sends a 'request refused' message for display by the meter. Upon receipt of an acceptable request for credit, the resetting terminal sends a 'set lock' message to the meter which sets the flag, referred to hereinbefore, stored in non-volatile memory and thereby prevents the meter carrying out any franking operations.

The resetting terminal sends an 'encrypt register' message to the meter to read the contents of the credit register. This message contains a random number generated by the resetting terminal. The meter responds to this message by reading the contents of the credit register and transmitting a 'present encrypt register' message to the resetting terminal. This message contains this value and the random number encrypted. This may be followed by the terminal sending a series of similar messages containing a random number to the meter to read the contents of the tote register, the items count register and the value in a high items register in the meter which stores the value of postage charge in relation to frankings of value higher than a predetermined value. Each of these 'encrypt register' messages includes a random number as explained hereinbefore. In response to these 'encrypt register' messages, the meter returns 'present encrypted register' messages including the value of the content of the corresponding register together with the random number received in the 'encrypt register' message. The random number encrypted included in the 'present encrypt register' message presenting the register value to the terminal is the random number transmitted to the meter by the terminal in the 'encrypt register' message requesting the register value. In a resetting transaction, the same random number may be used in each message requesting values of different registers or for greater security the random number may be different for each request message. The resetting terminal then sends an 'encrypt reset' message which contains the credit amount initially requested by the user together with a transaction identity code (TID) in the form of an encrypted data block. The transaction identity code comprises a pseudo-random number generated by a pseudo-random number generator in the resetting terminal. The meter also includes a pseudo-random number generator which corresponds to that in the resetting terminal. Both generators are operated in such a manner that the pseudo-random number generated by one generator corresponds to the pseudo-random number last generated by the other generator. Thus prior to a payment request the meter stores in non-volatile memory, a pseudo-random number generated by the generator in the meter. Upon acceptance of a payment request, the resetting terminal generates a corresponding pseudo-random number which is included in the 'encrypt reset' message. Upon receipt of the 'encrypt reset' message, the meter compares the TID contained in the 'encrypt reset' message with the TID stored in its memory. If the comparison indicates identity between the TIDs, the meter is enabled to add the credit amount to the current value in the credit register and the pseudo-random number TID is incremented to the next number in the series of pseudo-random numbers. If identity is not found the payment transaction is not permitted to continue and failure of the transaction is indicated on the display to the user. In the case where identity is found the user may accept or reject addition of this credit amount. If the amount is to be accepted a control key is operated to cause the amount to be added to the current value in the credit register. If the amount is not accepted by the user, operation of another control key causes the program routine to return to the start of the resetting routine.

At this stage the value in the credit register has been modified by the addition of the requested payment but the meter is prevented from being used for franking due to the flag being set. The meter then sends an 'unlock request' message to the terminal, the message includes a random number to enable the meter to verify the integrity of any response message received from the terminal. In response the terminal sends an 'encrypt register' message requesting the current value stored in the meter's credit register. The terminal then carries out checks on the received data and the data already in the customer record to ascertain whether there are any discrepancies and whether the credit payment has been accepted. If the check indicates that the credit payment has been accepted, the terminal increments the TID to the next pseudo-random number of the series so that it corresponds to that TID now stored in the meter. The terminal releases the meter from resetting mode by sending an 'unlock' message which contains the random number included by the meter in its 'unlock request' message together with the current TID stored in the terminal. Upon receipt of this 'unlock request' message the meter compares the random number with that sent by the meter in the 'unlock request' message and also compares the received TID with the TID stored in memory in the meter. If both comparisons are successful the meter is enabled to un-set the flag and thereby be operative to carry out franking operations. If a discrepancy is detected between the readings of the register values and the customer record, the 'unlock request' is refused and this is indicated on the meter display to the user. After successful completion of the resetting routine, both the meter and the terminal terminate communication to the telephone network.

It will be appreciated that any of the messages referred to hereinbefore which contain data which it is desired to keep secure would be transmitted in encrypted form and decrypted by the receiving meter or terminal respectively. Those messages which contain only data which it is not necessary to keep secure may be transmitted without encryption. However it may be convenient in order to handle all messages in the same manner to encrypt all messages at the transmitter and to decrypt all messages at the receiver.

The resetting terminal preferably maintains a record of account for the user which contains a value of credit available for allocation to a user of the franking meter. When the terminal determines that the requested payment has been accepted by the meter and added to the credit register value, the credit available for allocation to the user is decremented by the amount accepted by the meter. The value of credit available for allocation may be purchased in advance or, if permitted by the postal authority, an agreed limit of credit may be made available for which payment is made in arrears. The record of account may be utilised for preparing billing for payment by the customer.

While the communication between the franking meter and the resetting terminal has been described hereinbefore as utilising a telephone network, if desired the communication may be by way of a dedicated transmission line or by other forms of communication such as radio communication.

Each message may include a task identification to enable the meter and the terminal to identify messages received from the terminal and meter respectively.

After sending the 'request payment' request, the meter may indicate an error condition if a correct response message is not received back from the terminal within a predetermined time period, for example 30 seconds. While the meter is waiting for a response from the terminal all keyboard inputs are ignored by the micro-processor. Similarly after the meter sends an 'unlock request' message, if an 'unlock' message or 'refuse request' message is not received from the terminal, the meter may indicate an error condition.

In the event of communication failure or power failure at the meter, the meter remains in the resetting mode with the flag set to prevent franking operations. Upon re-establishment of communication or power, the resetting routine, if not completed, is re-initiated or, if completed but an 'unlock' message has not been received, an 'unlock request' message is sent and this request is effected as described hereinbefore.

Some postal authorities require users of franking machines to purchase credit by pre-payment for use in a franking machine and to meet this requirement the franking machine is provided with a credit register to store a value of credit remaining available for franking and this credit register needs to be reset at intervals with additional credit for further use of the machine as has been described hereinbefore. However other postal authorities operate a post payment system in which the usage of the meter is monitored at intervals and payment is required for the use of the meter up to that time. A franking meter for use with this post payment system may incorporate means for locking the meter from further operation upon the occurrence of any predetermined condition. Such conditions may include, lock out on a predetermined date, lock out upon completion of a predetermined number of franking operation cycles or lock out upon the value used in franking exceeding a predetermined value. The method of unlocking the meter as described hereinbefore after resetting the credit register may be utilised with advantage for unlocking a meter used in a post payment system. When a lockout occurs, the user causes the meter to initiate a communication with the postal authority terminal. The terminal responds by requesting meter identification and tote register value. The terminal checks the meter data against stored customer records and if this check is satisfactory a 'request unlock' message from the meter is responded to by the terminal with an 'unlock' message transmitted to the meter. As hereinbefore described, the messages include a random number and the data block of the message from the meter containing the tote register value is encrypted for reasons of security.

In order to overcome problems arising due to unexpected lockout of the meter or to difficulty in establishing communication between the franking meter and the terminal, the meter may be arranged to provide advance warning that lock out of the meter is likely to occur shortly due to the credit value decreasing to below predetermined limit in the case of a meter for a pre-payment system or to one of the predetermined conditions occurring with a post payment meter. This has the effect of providing a tolerance to low credit limit or to the predetermined condition at which lock out will occur thereby enabling the user to continue using the franking meter for a limited amount of franking.

I claim:

1. A method of resetting credit in a credit register of a franking meter connectable by communication means to a resetting terminal including the steps of generating a first pseudo-random number in the meter; independently generating the first pseudo-random number in the terminal; establishing communication between the franking meter and the resetting terminal; maintaining said communication and while said communication is maintained transmitting from the meter to the terminal a request for credit of a selected variable value amount, said request specifying the amount of credit; in response to said request for credit causing the terminal to interrogate the meter to establish identity of the meter; setting means in the meter to prevent operation of the meter for franking; transmitting from the meter to the terminal a value of credit in the credit register of the meter; operating the terminal to check validity of the request for payment and if valid transmitting a message containing the first pseudo-random number generated in the terminal and data representing said selected variable value amount to the meter; operating the meter to compare the first pseudo-random number received in the message from the terminal with the first pseudo-random number generated in the meter; if the comparing is successful adding the selected value amount to the credit register; generating a second pseudo-random number in the meter and independently generating the second pseudo-random number in the terminal and unsetting the means preventing operation of the meter for franking after acceptance or rejection of the selected value amount in the credit register by the steps of sending an un-lock message from the terminal to the meter, said unlock message including the second pseudo-random number generated by the terminal; comparing in the meter the received second pseudo-random number and the second pseudo-random number generated in the meter and un-setting said means only if the comparison is successful.

2. A method as claimed in any claim 1 in which unsetting of the means for preventing operation of the meter for franking operations is initiated by an unlock request message transmitted from the meter to the terminal; and in which in response to said unlock message the terminal is operative to request data from the meter relating to the contents of the credit register and other registers of the meter and to check said data with an account record in the terminal and to un-set the means only if said data agrees with said account record.

3. A method as claimed in claim 1 wherein in the event of a failure in supply of power to the meter apparatus the means preventing operation of the meter apparatus remains set until un-set by the steps of sending an un-lock message from the terminal to the meter, said unlock message including the second pseudo-random number generated by the terminal; comparing in the meter the received second pseudo-random number and the second pseudo-random number generated in the meter and un-setting said means only if the comparison is successful.

4. A method as claimed in claim 1 wherein in the event of a failure in communication between the meter apparatus and the terminal apparatus the means preventing operation of the meter apparatus remains set until un-set by the steps of sending an un-lock message from the terminal to the meter, said unlock message including the second pseudo-random number generated by the terminal; comparing in the meter the received second pseudo-random number and the second pseudo-random number generated in the meter and un-setting said means only if the comparison is successful.

5. A method of unlocking a franking meter which has locked due to occurrence of a predetermined condition including the steps of establishing communication directly between the franking meter and a remotely located resetting terminal; generating a pseudo-random number independently at both the franking meter and at the terminal; operating the franking meter to send a request unlock message to the terminal; transmitting from the terminal to the franking meter at least one message requesting franking meter data, each said message including a true random number; in response to the message from the terminal, transmitting from the meter to the terminal the meter data and said true random number, said terminal responding by checking validity of the request for unlock including comparing said true random number received from the meter with the true random number included in the message transmitted from the terminal and if the request for unlock is valid subsequently transmitting to the meter an unlock message containing said pseudo-random number generated at the terminal; comparing the pseudo-random number received in the unlock message with the pseudo-random number generated in the meter and if the comparison is successful unlocking the meter until the re-occurrence of said predetermined condition.

* * * * *